United States Patent [19]
Forni

[11] 3,738,689
[45] June 12, 1973

[54] FITTING FOR ASBESTOS CEMENT PIPE

[76] Inventor: Jay S. Forni, 1101 Leema Drive, Danville, Calif. 94526

[22] Filed: July 6, 1970

[21] Appl. No.: 52,470

[52] U.S. Cl. ............... 285/55, 285/230, 285/288, 285/369
[51] Int. Cl. .......................... F16l 9/08, F16l 21/02
[58] Field of Search ............... 285/230, 288, 55, 285/369, 345, 231; 138/109, 175, 176; 72/81, 82, 83, 84, 85, 91, 80

[56] References Cited
UNITED STATES PATENTS

| | | | |
|---|---|---|---|
| 3,222,904 | 12/1965 | Ernestus | 72/91 |
| 3,282,078 | 11/1966 | Kaesemeyer | 72/82 |
| 2,470,818 | 5/1949 | Hirsh | 285/374 X |
| 1,529,495 | 3/1925 | Mitchell et al. | 285/288 |
| 922,480 | 5/1909 | Hodge | 285/288 X |
| 3,467,144 | 9/1969 | Rice et al. | 138/176 |
| 3,415,544 | 12/1968 | Hucks | 285/55 |
| 2,738,992 | 3/1956 | Heisler | 285/369 |

FOREIGN PATENTS OR APPLICATIONS

| | | | |
|---|---|---|---|
| 1,041,842 | 6/1953 | France | 138/176 |
| 798,585 | 7/1958 | Great Britain | 285/55 |

OTHER PUBLICATIONS

Spin Forming – Reprinted from Aircraft and Missiles Manufacturing, Feb. 1958, 8 pages, Meta–Dynamics Division.

*Primary Examiner*—Thomas F. Gallaghan
*Attorney*—Owen, Wickersham & Erickson

[57] ABSTRACT

Fittings for asbestos cement pipe are made utilizing cement-lined iron pipe sections, by welding to each end of each section a generally cylindrical sleeve of sheet metal having a portion of the same diameter as the iron pipe succeeded by a spin-formed section of smaller diameter meeting the other one at a step-gasket shoulder, the spin-forming providing increased tensile strength to hold the portion in round, this portion being succeeded by a spin-formed tapered terminal portion ending in a radial lip. After the sleeves are welded to the iron pipe section, they are interiorly lined with cement, using the lips to help hold the cement in place at each end. Then a coupler of asbestos cement having a pair of interior annular grooves, each with a gasket, is placed over the sleeve, and one of the gaskets is abutted against the shoulder.

5 Claims, 7 Drawing Figures

PATENTED JUN 12 1973   3,738,689
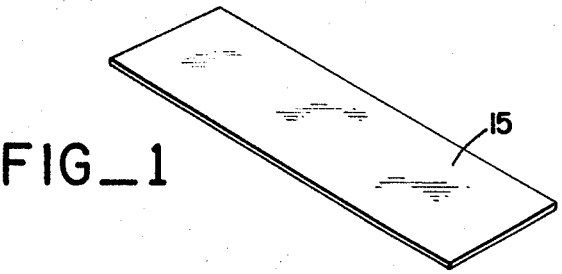
FIG_1
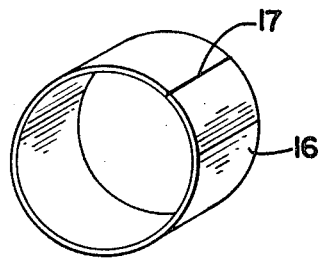
FIG_2
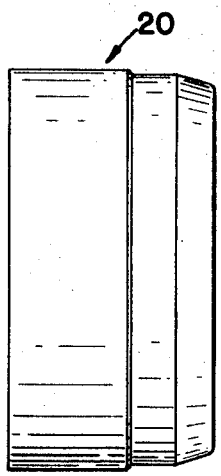
FIG_3
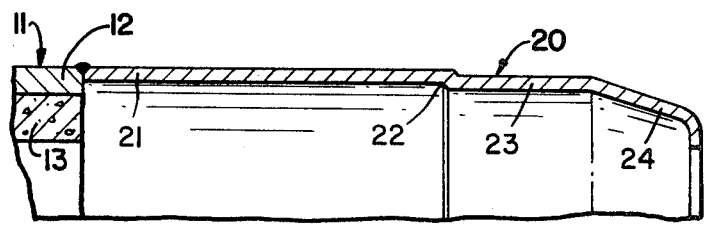
FIG_4
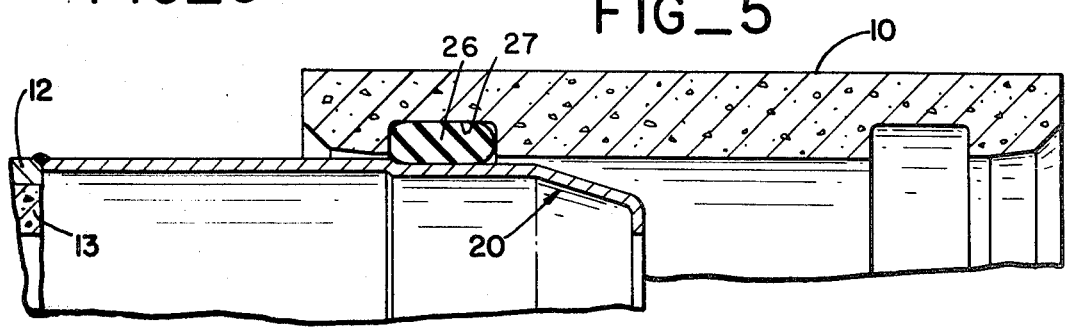
FIG_5
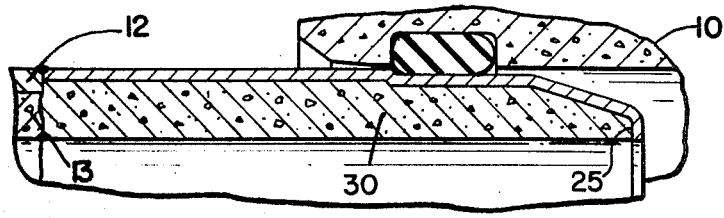
FIG_6
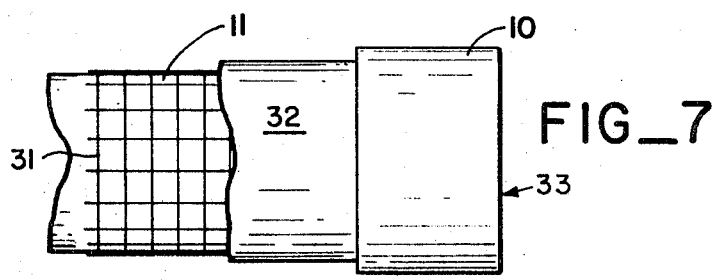
FIG_7
INVENTOR.
JAY S. FORNI
BY
Owen, Wickersham & Erickson
ATTORNEYS

FITTING FOR ASBESTOS CEMENT PIPE

BACKGROUND OF THE INVENTION

This invention relates to an improved fitting for asbestos cement pipe.

Asbestos cement pipe is in wide use and especially for very large diameter pipe, for example, from 6 inches to 36 inches. When used in city piping or in irrigation schemes or even with other fluids, it is necessary to join the long sections of asbestos cement pipe together by fittings, and there is a wide variety of such fittings, so that they generally have to be made up for each job; it is rarely feasible to carry in stock enough fittings of the wide variety of pipes and sizes needed. Thus, there are elbows, straight coupling sections, tees, angled sections, reducing sections, and so on.

These fittings have been made heretofore by taking cement-lined iron pipe and cutting it off in sections, sometimes welding sections together as for making elbows and angles, sometimes cutting openings through the side wall and in all instances having some means for coupling at the end, or at least at one end.

Heretofore, the fittings have been provided with a coupling end by using cast iron pipe sections that are machined down or provided with some type of bolted joint to give the accurate tolerances needed. The importance of the accuracy of the tolerances is a point well worth considering. The manufacturers provide asbestos cement coupler members, which are in effect cylindrical members of asbestos cement having two spaced apart interior annular grooves. In each of these is inserted an O-ring or suitable ring gasket which is to provide the seal, for if the pipe leaks at its couplings, it is of course completely unsatisfactory. The asbestos cement couplers are made up in large number and are identical for any one particular size, so that they are carried in stock and must be uniform. However, the problem there has been that since they are thus made and are made quite accurately, the members that cooperate with them must likewise be made quite accurately. They must be round and not distorted into an oval or elliptical or irregular shape, and the tolerance is typically kept within twenty or thirty thousandths of an inch.

Since the individual coupling sleeves have had to be made individually, the tolerances have been achievable only by machining and even when achieved, have been very difficult to maintain. When the machined metal ends are welded on to the cement-lined iron pipe, the heat of welding has tended to distort them, and although the distortion may be slight from a visual standpoint, it is too much to be tolerated and still prevent leakage at the couplings. Thus, although machining is expensive and is quite accurate, the results are often nullified by the necessity of the later welding to the main iron pipe. After these elements are put in, and in many cases are lined with cement, there is still a further difficulty in keeping them round, due to the cooling and other factors met, and manufacturers have often welded steel bars, sometimes two or three, across the mouth of this machined sleeve in order to maintain it in round during the initial welding. However, these bars have to be cut off before use and whether cut off in the field or elsewhere, the very heat needed to cut them off with a welding torch results in the danger of distortion again, and they go out of round.

What has been needed is a less expensive and more accurate way of making the fittings so that they can be made in any desired shape, maintain the desired tolerance, and stay in round.

SUMMARY OF THE INVENTION

The fittings of the present invention utilize sheet metal, such as 10 or 12 gauge sheet steel, which can readily be cut into strips, rolled into a circle with its ends welded together to make a completely accurate initial cylindrical sleeve of the same diameter as the iron pipe. Then the sleeve itself is formed to a desired shape by means of spinning, which greatly increases the tensile strength and enables it to maintain its round shape much better than does a cast and machined member. The spinning first provides an insetting shoulder leading to a succeeding cylindrical portion and it is against this shoulder that the gasket of the asbestos cement coupler is to abut. The smaller cylindrical portion leads to a portion that is spun in still further, preferably frustoconically, and then terminates in a radially inturned lip, which serves as a form when the inner periphery is lined with cement. Due to the thinness of light sheet metal, welding this material does not generate appreciable heat, whereas the heat generated when welding thick iron pipes is a major factor in its welding. Hence, after being made to shape, the sleeve is welded to the iron pipe section, is lined with cement to protect the metal from corrosion, the coupler is installed and the gasket set in place, and then the outer cement coating is placed over the iron of the iron pipe section.

The result is a less expensive but more accurate and stronger coupler which does much better in meeting the required tolerances and in retaining its true roundness.

Other objects and advantages of the invention will appear from the following description of a preferred embodiment.

BRIEF DESCRIPTION OF THE DRAWINGS

In the drawings:

FIG. 1 is a view in perspective of a strip of sheet metal such as steel cut to length for forming the sleeve of FIG. 2.

FIG. 2 is a view in perspective of a tube formed by rolling the strip of FIG. 1 into a perfect circle and then welding its ends together.

FIG. 3 is an enlarged view in side elevation of the sleeve of FIG. 2 after it has been spun into a final shape.

FIG. 4 is a further enlarged fragmentary view in section of the sleeve of FIG. 3 inserted on a length of cement-lined steel pipe, to which it is welded.

FIG. 5 is a view similar to FIG. 4 with a coupler installed.

FIG. 6 is a similar view of the article of FIG. 5 after it has been lined with cement.

FIG. 7 is a fragmentary view in side elevation of the pipe with exterior reinforcing thereon.

DESCRIPTION OF THE PREFERRED EMBODIMENT

In making the fitting of this invention, conventional asbestos cement couplers 10 are used, as are sections 11 of iron pipe 12 that are interiorly lined with cement 13. Depending on the nature of the fitting, these iron pipe sections 11 are cut to a desired shape, and a desired size is used. The end portions to which the fittings are applied are cut accurately and the work of this invention begins with the work of making the pieces that go on the end to transform these pipe sections 11 into fittings.

To start with, sheet steel, such as ten gauge or twelve gauge material, is cut into strips 15 (FIG. 1) of a desired length and width, the length being such that the device when rolled can be made into a cylinder 16 (FIG. 2) having a certain exact circumference and diameter, the length being determined by the requirements of fitting. After the strip 15 has rolled into a perfect circle, its ends are welded together at 17.

The next step is a very important feature of the invention: this generally cylindrical sleeve 16 is spin-formed to a final shape, shown in FIGS. 3 and 4. Spin forming reduces the diameter of certain portions of the steel cylinder, makes it more compact, and, as a result, substantially increases its tensile strength, so that the tensile strength of the finished sleeve 20 may be two or three times as great as that of the initial sleeve 16 or of the sheet metal strip 15 used to make it. Moreover, the spin forming is preferably done on a mandrel which has previously been machined very accurately, so that in order for the spin-formed sleeve 20 to come off the mandrel, it must be round. As a result, initial roundness of the finished article is assured.

As shown in FIGS. 3 and 4, the general shape of all such sleeves 20, as finished, is substantially the same, though their dimensions may vary from fitting to fitting. In each instance, there is an inner cylindrical end portion 21 which is to abut and be welded to the iron pipe. This portion 21 terminates at a gasket stop shoulder 22 which leads to a succeeding cylindrical portion 23 of smaller diameter. Typically, the shoulder 22 results in the outer periphery being reduced thereat by about 0.015 inch to 0.030 inch, depending upon the article being made, for there will be a somewhat deeper shoulder 22 for 36 inch pipe than for 6-inch pipe. The angle of the shoulder 22 is preferably about 36°, though it can be somewhat greater or lesser if desired, but it should be kept fairly close to that figure to provide a range within the desired tolerance.

The smaller cylindrical portion 23 is the portion on which the gasket is to slide, and it is very important for the dimensions of the portion 23 to lie within the proper tolerance, which is preferably kept within ± 0.020 in. This portion 23 then is succeeded, preferably, by a generally conical portion 24 about 1 inch long, where the tolerances are somewhat less critical. This portion 24 provides a strengthening end wall and a lead-on portion for helping to center the gasket. It also helps to provide a well for the cement lining. Finally, the sleeve 20 terminates in a radially inturned portion 25 which provides a mortar stop. This again is made accurately so that the cement lining can stop directly at that point and be the same as that of the cement lined pipe.

When the sleeve 20 has been formed to exact shape and is removed from the mandrel, it is quite round, quite strong, and well able to maintain its roundness. Preferably, it is then coated, exteriorly at least, with suitable material to protect the steel against rust, such as red lead.

Whether coated or not, the next step is to weld this sleeve on to a pipe section. The pipe section 11 has been previously cut to shape and this usually results in an irregular edge of the cement lining 13 but of course a very regular edge of the iron pipe 12 itself. This sleeve member 20 is welded to it and, due to the spinning, maintains its roundness during and after the welding. The pipe section 11 may have a sleeve 20 at other locations. The next step is usually to place an asbestos cement coupler 10 onto the sleeve 20. One gasket 26 of the coupler 10 is placed in its groove 27, and the coupler 10 is put on until that gasket 26 abuts against the gasket stop shoulder 22 quite firmly. Another gasket is used for the succeeding pipe section. Once the gasket 26 is forced into place, the fitting will not leak, and tests have shown that it will maintain this accuracy so that the supplier can guarantee it.

After this, although it could be done earlier if desired, a cement inner lining 30 is installed and troweled so as to be the same inner diameter as the cement lining 13 of the pipe section 11. The ¼ inch lip 25 at the end helps to provide a kind of form for this, for the cement is placed in wet, usually by hand, and is hand troweled. When this is complete, the fitting interiorly has been completed and there is a complete cement lining, thereby preventing internal corrosion by the water or other fluid passing through the pipe.

It is also advisable to cover the iron pipe section 11. Reinforcing wire 31 is placed around the pipe 11, and cement 32 is applied over that to cover it so that there is no exposed metal left. Then the finished fitting 33 is cured, as by being sealed with a plastic sheet that covers it and prevents the exit of moisture, so that the cement can cure without having to have additional water added.

The finished result, then, is a fitting 33 having at each end a coupling sleeve 20 with a first portion 21 of one outer diameter succeeded at a gasket stop shoulder 22 by a second portion 23 of a smaller diameter, of which the metal has been spin-formed to increase the tensile strength. That in turn is followed by the tapered or conical end portion 24 and by the mortar stop portion 25 that is radially turned in, with the whole being interiorly lined with concrete 30, and, after application of the asbestos cement coupler 10, exteriorly covered with concrete also.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A fitting for asbestos cement pipe, for use with a hollow asbestos-cement coupler for coupling the fitting to said pipe and having two spaced-apart interior grooves with a solid elastomeric gasket ring in each groove for peripheral sealing engagement with the outer surface of the fitting and pipe, respectively, comprising:

an iron pipe section interiorly lined with cement, having welded to each end in end-to-end abutment a generally cylindrical sleeve of sheet metal of a wall thickness substantially less than the wall thickness of said iron pipe and having one cylindrical end portion the same outer diameter as said iron pipe and a directly succeeding gasket-engaging cylindrical spin-formed portion of smaller diameter, having greatly increased tensile strength relative to other portions of the sleeve and resistance to change from true roundness by the heat of welding, said smaller diameter portion, meeting the larger-diameter portion at a gasket-stop shoulder and sealing accurately upon engagement with a said gasket ring without the necessity of water pressure and sealing both in the presence and absence of such water pressure, said sleeve having a terminal portion ending in a radial lip having substantially the same inner diameter as the cement lining of said iron pipe, said sleeve being lined with cement continuous with that of said iron pipe and an inner diameter the same as that of said lip.

2. The fitting of claim 1 with a said asbestos-cement coupler placed over said sleeve with a said gasket ring abutting against said gasket-stop shoulder.

3. The fitting of claim 1 wherein said radial lip is joined to said cylindrical portion of smaller diameter by a tapered-in frustoconical portion.

4. An assembly comprising an asbestos-cement hollow coupler having two spaced-apart interior cylindrical grooves with a solid elastomeric gasket ring in each groove with one gasket ring adapted to be seatable on a section of abestos-cement pipe having a gasket-seating cylindrical surface and shoulder, a fitting seatable in the other gasket ring, said fitting comprising a metal pipe section interiorly lined with cement, having welded to each end in end-to-end abutment, a generally cylindrical sleeve of sheet steel of a wall thickness substantially less than the wall thickness of said metal pipe and having one cylindrical end portion the same outer diameter as said metal pipe and a directly succeeding gasket-engaging cylindrical spin-formed portion of smaller diameter, having greatly increased tensile strength with respect to other portions of said sleeve and resistance to distortion in shape by the heat of welding, said smaller diameter portion meeting the larger-diameter portion at a gasket-stop shoulder, said sleeve having a terminal portion ending in a radial lip having substantially the same inner diameter as the cement lining of said metal pipe, said sleeve being lined with cement continuous with that of said metal pipe and an inner diameter the same as that of said lip, said asbestos-cement coupler being placed over said fitting with said other gasket ring abutting against said gasket-stop shoulder and sealing against said spin-formed portion both in the presence and absence of hydraulic pressure.

5. The assembly of claim 4 wherein said radial lip is joined to said cylindrical portion of smaller diameter by a tapered-in frustoconical portion.

* * * * *